US012586140B2

(12) United States Patent
Kozikowski et al.

(10) Patent No.: US 12,586,140 B2
(45) Date of Patent: Mar. 24, 2026

(54) AUTOMATED PROPERTY INSPECTIONS

(71) Applicant: Tensorflight, Inc., New York, NY (US)

(72) Inventors: Robert Kozikowski, New York, NY (US); Zbigniew Wojna, London (GB); Lukasz Jocz, Warsaw (PL); Rafal Tybor, Cracow (PL); Robert Paluba, Warsaw (PL); Wladyslaw Surala, Warsaw (PL); Piotr Jarosz, Warsaw (PL)

(73) Assignee: TENSORFLIGHT, INC., New York, NY (US)

( * ) Notice: Subject to any disclaimer, the term of this patent is extended or adjusted under 35 U.S.C. 154(b) by 790 days.

(21) Appl. No.: 17/828,138

(22) Filed: May 31, 2022

(65) Prior Publication Data
US 2022/0292619 A1 Sep. 15, 2022

Related U.S. Application Data

(63) Continuation-in-part of application No. 17/719,212, filed on Apr. 12, 2022, now Pat. No. 12,456,154,
(Continued)

(51) Int. Cl.
*G06Q 50/163* (2024.01)
*G06V 10/82* (2022.01)
(Continued)

(52) U.S. Cl.
CPC .......... *G06Q 50/163* (2013.01); *G06V 10/82* (2022.01); *G06V 20/17* (2022.01); *G06V 20/176* (2022.01)

(58) Field of Classification Search
CPC ..................... G06T 7/97; G06T 7/0004; G06T 2207/10012; G06T 2207/20081; G06T 2207/30184; G06Q 40/08
See application file for complete search history.

(56) References Cited

U.S. PATENT DOCUMENTS 8,902,226 B2 * 12/2014 Meadow ................. G06F 16/50
345/419
9,436,148 B2 9/2016 Maeda
(Continued)

OTHER PUBLICATIONS

Wang, Lu et al., "Large-scale urban modeling by combining ground level panoramic and aerial imagery", THird International Symposium on 3D Data Processing, Visualization, and Transmission (3DPVGT'06). IEEE, 2006. (Year: 2006).

*Primary Examiner* — Bobbak Safaipour
(74) *Attorney, Agent, or Firm* — Ruggiero McAllister & McMahon LLC

(57) ABSTRACT
A property inspection service hosted on a web-based server system. The server system receives a list of physical addresses each corresponding to different parcels. For each address, the server system obtains multiple images including overhead images and perspective view images. A first trained model analyzes selected overhead images individually to identify one or more building structures. A second trained model analyzes selected perspective view images individually to identify a primary building structure. A third trained model analyzes the selected overhead images and the perspective view images together in an integrated approach to identify attributes associated with identified building structure. A digital report is generated as a graphical user interface configured to display the selected images and the attributes associated with the identified building structure.

19 Claims, 12 Drawing Sheets

Related U.S. Application Data which is a continuation-in-part of application No. 16/924,588, filed on Jul. 9, 2020, now Pat. No. 11,302,034.

(51) Int. Cl.
| | |
|---|---|
| *G06V 20/10* | (2022.01) |
| *G06V 20/17* | (2022.01) |

(56) References Cited

U.S. PATENT DOCUMENTS

| | | | | |
|---|---|---|---|---|
| 9,536,148 | B2 * | 1/2017 | Gross | G06Q 50/16 |
| 10,078,866 | B1 * | 9/2018 | Eraker | G06Q 30/0643 |
| 10,410,413 | B2 * | 9/2019 | Upendran | G06T 17/00 |
| 10,540,577 | B2 * | 1/2020 | Taylor | G06V 20/176 |
| 10,552,913 | B1 * | 2/2020 | Brandmaier | G06F 16/51 |
| 10,984,489 | B1 * | 4/2021 | Bruce | G06Q 50/16 |
| 11,093,982 | B1 * | 8/2021 | Humphries | G06Q 30/0278 |
| 11,100,704 | B2 * | 8/2021 | Mishra | G06F 30/13 |
| 2009/0171980 | A1 * | 7/2009 | Meadow | G06F 16/51 |
| 2009/0265193 | A1 * | 10/2009 | Collins | G06Q 30/0185 |
| | | | | 901/46 |
| 2010/0085350 | A1 * | 4/2010 | Mishra | G06T 15/00 |
| | | | | 345/419 |
| 2013/0191252 | A1 * | 7/2013 | Meadow | G06F 16/78 |
| | | | | 705/26.64 |
| 2013/0191292 | A1 * | 7/2013 | Meadow | H04N 5/28 |
| | | | | 705/306 |
| 2014/0019302 | A1 * | 1/2014 | Meadow | G06Q 30/0623 |
| | | | | 705/26.61 |
| 2015/0029182 | A1 * | 1/2015 | Sun | G06F 3/14 |
| | | | | 345/419 |
| 2015/0213315 | A1 * | 7/2015 | Gross | G06T 5/50 |
| | | | | 382/159 |
| 2015/0227893 | A1 * | 8/2015 | Huynh | G06Q 10/10 |
| | | | | 705/4 |
| 2016/0314546 | A1 * | 10/2016 | Malnati | H04W 4/021 |
| 2018/0225870 | A1 * | 8/2018 | Upendran | G06T 17/00 |
| 2019/0156570 | A1 * | 5/2019 | Sanjurjo | G06T 19/003 |
| 2019/0251352 | A1 * | 8/2019 | Hovden | G06V 20/176 |
| 2020/0034664 | A1 * | 1/2020 | Jacobs | G06F 18/217 |
| 2020/0143212 | A1 * | 5/2020 | Okazaki | G06N 3/08 |
| 2020/0258285 | A1 * | 8/2020 | Dempsey | G06T 15/20 |
| 2020/0302630 | A1 * | 9/2020 | Spader | G06T 1/0007 |
| 2020/0309541 | A1 * | 10/2020 | Lavy | G06V 20/588 |
| 2020/0410278 | A1 * | 12/2020 | Nelson | G06F 18/22 |
| 2021/0027528 | A1 * | 1/2021 | Labrie | G06T 7/0002 |
| 2021/0158609 | A1 * | 5/2021 | Raskob | G06T 17/05 |
| 2021/0232988 | A1 * | 7/2021 | Thornberry | G06Q 50/08 |
| 2021/0248419 | A1 * | 8/2021 | Cumming | G06N 3/045 |
| 2022/0215645 | A1 * | 7/2022 | Lebaron | G06V 10/26 |
| 2022/0292619 | A1 * | 9/2022 | Kozikowski | G06Q 50/163 |
| 2023/0060097 | A1 * | 2/2023 | Knuffman | G06T 5/77 |
| 2023/0118181 | A1 * | 4/2023 | Matowitz | G06T 7/33 |
| | | | | 348/144 |
| 2023/0237599 | A1 * | 7/2023 | Maehler | G06Q 50/16 |
| | | | | 705/313 |
| 2025/0037401 | A1 * | 1/2025 | Murali | G06T 7/75 |

* cited by examiner

100

External
Resources
120

Image Data 1
121

Image Data 2
122

Image Data 3
123

Location Data
125

110a

Network
101

110b

Property Inspection
Service
150

Local
Resources
151

200

Receive Address(es) — 202

Obtain Images for Each Address — 204

Analyze Overhead Images — 206

Analyze Ground Level Images — 207

Integrated Analysis — 208

Compile and Generate Report — 210

Send Report to Client — 212

500

502          504          506
↓            ↓            ↓

| Object Type | Output | Explanation |
|---|---|---|
| Building Footprint | polygon | footprint of building structure |
| Tree | bounding box | poses risk of falling on house or catching fire |
| Solar Panel | polygon | group of solar panels |
| Pool | polygon | swimming pool |
| Wall | polygon | Building wall |
| building – primary | Polygon | Main structure |
| building – other | Polygon | Secondary structures |
| floor baseline | Line | FEMA guideline |
| roof | polygon | Roof |
| door | rectangle | door |
| building text | Alphanumeric | Signage or street address |

| Attribute | Format | Description |
|---|---|---|
| URL | Text | Access link (URL) to the property imagery |
| Street Address | Text | Full address of the property |
| Latitude and Longitude | Number | Latitude and Longitude of building centroid |
| Building Footprint | Text | Latitude and Longitude of each building corner (GeoJSON) |
| Building Footprint | Number | Defined by the perimeter of the building plan |
| Construction Type | Text | Construction material of main beating element of the building: Reinforced Concrete / Masonry / Steel / Wood Frame |
| RMS Construction Code | Number | 3A - RCMRF with Shear Walls<br>2B - Unreinforced Masonry<br>4A – Steel Frame<br>1 – Wood Frame |
| ATC Construction Code | Number | 5 - Reinforced Concrete Shear Wall (with Frame)<br>3 - Unreinforced Masonry (Bearing Wall)<br>9 - Braced Steel Frame<br>1 - Wood Frame |
| Building Square Footage | Number | Footprint Area × Number of Stories. |
| Building Replacement Cost | Number | |
| Roof Geometry | Text | Predominant shape of the building roof:<br>Hip / Flat / Gable / Gambrel / Mansard / Pyramid / Shed / Complex |
| Roof Pitch | Text | The amount of rise compared to horizontal measurement<br>Flat (<5°) / Low (5-18.5°) / Moderate (18.5-45°) / Steep (>45°) |
| RMS/ATC Roof Geometry | Number | 0 - Unknown<br>1 - Flat roof with parapets<br>3 - Hip roof with slope less than 6:12 (26.5°)<br>4 - Hip roof with slope greater than 6:12 (26.5°)<br>5 - Gable roof with slope less than or equal to 6:12 (26.5°)<br>6 - Gable roof with slope greater than 6:12 (26.5°)<br>7 - Braced gable roof with slope less than or equal to 6:12 (26.5°)<br>8 - Braced gable roof with slope greater than 6:12 (26.5°) |
| Facade Condition | Text | Categorized by analysis of relevant risk factors:<br>Poor / Fair / Good |
| Roof Condition | Text | Categorized by analysis of relevant risk factors:<br>Poor / Fair / Good |
| Occupancy Types | Text | Categorizing structures based on their usage:<br>114 categories. RMS/, ISO mapping available |

FIG. 6

Figure 1. Detailed diagram of the model used for building attributes extraction.

AUTOMATED PROPERTY INSPECTIONS

TECHNICAL FIELD

This disclosure relates to techniques for using different perspective images for modeling and analyzing selected real properties for various purposes, such as underwriting, risk modeling, and claims on the properties.

BACKGROUND

Insurance or reinsurance for a commercial property is based on the value of the property including building structures and other relevant features, and the risks associated with the various attributes or characteristics of the building(s) and the property features. In general, there are four basic characteristics that an underwriter considers in performing a risk evaluation, namely, construction, occupancy, protection and exposure (COPE). Other attributes and/or characteristics of the commercial property can also be identified and evaluated as part of the risk analysis.

The most basic element of a building is its construction, including the materials from which a building structure is made. Many insurers classify commercial buildings into categories based on their construction type. Each classification reflects both the building materials used (such as wood or concrete) and the combustibility and damageability of the materials used for major structural features. For example, a system developed by the Insurance Services Office (ISO) includes six building construction classifications: frame; joisted masonry; noncombustible; masonry noncombustible; modified fire resistive; and fire resistive.

Occupancy describes the purpose for which the property is used, such as retail food market, furniture manufacturing, and apartments, to name a few, as well as how the insured manages the hazards associated with what they do. Protection means the methods used to safeguard a building from fire and other perils, including both public and private protection. Exposure refers to external hazards that exist largely due to the building's location. Some hazards are natural. A building located in a breezy area may be subject to damage by high winds. Other natural hazards include sinkholes, hail, lightning, and heavy snow. Natural hazards can vary widely from one location to another.

One conventional method for collecting relevant data is to conduct "in place" inspections, where a representative of the insurer (or the underwriter) visits the property and makes a visual assessment of the relevant property attributes. Another approach is to manually review photographs of the property and its buildings on publicly available websites. A more recent approach is to obtain satellite data and construct algorithms to evaluate the satellite images and extract relevant data.

However, it is important when valuing a policy that the data relied upon is valid and current. Mistakes arise from the use of unreliable or outdated data sources, with errors appearing either in the manual input of data or from inaccurate information obtained from brokers, agents, or property owners. As a result, errors in the classification of properties can lead to a lower valuation thereby generating less in premium payments, i.e., premium leakage, a lost opportunity for insurers. An analysis by Verisk Analytics, Inc. estimated the premiums leakage due to misclassification at $4.5 billion annually. Further, the same Verisk analysis concluded that commercial real estate was wrongly classified by construction type in 32.5% of the cases studied, and the building area was incorrectly estimated in 80% of the cases studied. These problems can lead to significant under-valuing or overvaluing of insurance premiums for commercial properties.

Therefore, there is a need for improved techniques for collecting reliable, precise and current attribute data for commercial properties in order to accurate value the properties for the purpose of insurance or reinsurance coverage on the properties.

BRIEF DESCRIPTION OF THE DRAWINGS

FIG. 5 is a chart listing example object types, the corresponding output type representations, and the explanations of the object types.

FIG. 6 is a chart listing examples of attributes associated with objects.

DETAILED DESCRIPTION

The following disclosure is directed to systems and methods for providing fully automated real property inspections in near-real time. In an embodiment, upon receiving a list of addresses from a user, multiple images are obtained of buildings and/or structures on the real property parcel(s) that correspond to each of the listed addresses, including at least two different perspective views of each parcel among the images. For example, an overhead view is analyzed with a first computer-based model that is configured and has been trained to identify buildings or other significant structures or objects from an overhead perspective. A different perspective view, such as a ground-level (street) view or an oblique angle view (e.g., 45°), is analyzed with a second computer-based model that is configured and has been trained to identify the building structures and/or other objects identified with the first model from the alternative perspective. A third computer-based model evaluates the different views together using an integrated approach that predicts the attributes associated with the identified objects, such as number of stories in the building. By using image recognition technology to evaluate the building structure(s) on each parcel from multiple view perspectives, better valuation estimates result leading to more competitive and accurate premium assessments.

Figure 1:
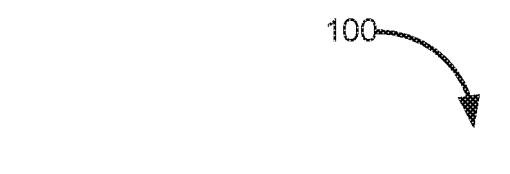
FIG. 1 is block diagram illustrating a basic system for automatically generating a commercial property inspection.

FIG. 1 is a block diagram illustrating a simplified system 100 for generating an automated property inspection report for commercial properties. The system 100 is merely exemplary and is intended to illustrate how various features may be implemented among various components in one embodiment.

The system 100 includes exemplary client systems 110*a* and 110*b*, each of which is associated with a different user. Each client system 110*a*, 110*b* is a computer-based device, such as a desktop computer, laptop computer, mobile computing device, etc., operated under the control of the user, and configured with an application that allows the client device to be connected to a property inspection service 150 through a communication network 101, such as the Internet. The different users of client systems 110*a*, 110*b* may have different roles and access rules within system 100, as further described below.

The property inspection service 150 is hosted on one or more web-based servers and is configured to communicate with users through a conventional web browser, as well as to communicate with local resources 151 and external resources 120 as necessary to support the processing operations of the property inspection service. The servers hosting the property inspection service 150 are programmed with various routines to manage and direct the receipt and handling of input data from the client systems 110*a*, 110*b*, the processing and analysis of the input data, and the generation of a useful digital display of property features for return to the customer.

The external resources 120 are utilized to obtain data and perform a variety of relevant tasks. For example, external resources 120 are used to obtain images from different view perspectives for each parcel, to provide access to additional processing resources, such as deep learning algorithms and computer vision technology, and to evaluate the images in order to extract the features of interest to the insurer and underwriter. In fact, as described herein, the use of multiple images having different view perspectives of the property of interest enhances the accuracy of the determinations made by the system. For example, a first set of images of each property can be obtained from an image data source 121, such as overhead images from aerial or satellite sources; a second set of images can be obtained from image data source 122, such as ground level or street view images; and a third set of images can be obtained from image data source 123, such as oblique views. Each of these images provides a different perspective view of the subject property, enabling a more comprehensive analysis of the property through image recognition and analysis of the multiple images, both individually and collectively. In addition to the imagery, the external resources may provide useful location data 125, such as parcel information, property appraisals, external geocoding services, address databases, etc.

Figure 2:
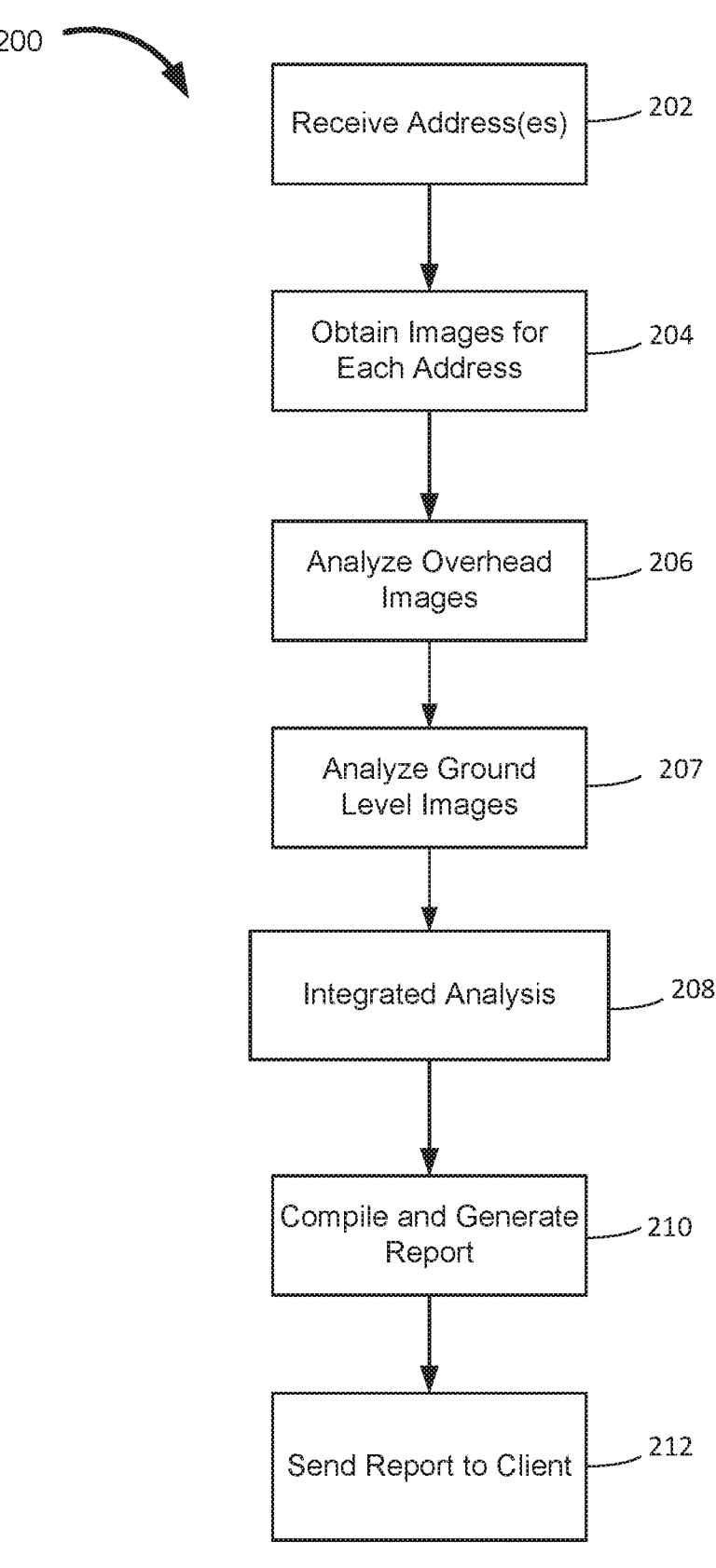
FIG. 2 is a flow chart illustrating a basic process for automatically generating a commercial property inspection.

Referring now to FIG. 2, a simplified process 200 for providing a property inspection report using system 101 is illustrated. In step 202, the property inspection service receives one or more physical property addresses from a client system, such as a list of addresses from a user who requests detailed property inspection reports in order to provide insurance or reinsurance estimates to customers, namely property owner(s). In step 204, the property inspection service obtains images for each physical property address from one or more external sources, including preferably images from at least two different perspective views of the property. For example, overhead images such as aerial images and satellite images may be obtained from third-party vendors such as Bing, Nearmap, Digital Globe and others, while ground level or street view images may be obtained from Bing, Mapillary, MLS listings, business websites and others. Various images may also be obtained from other sources, such as the crowd-sourced website www.openstreetcam.org or similar efforts, and government-sponsored websites.

In step 206, selected images in a first set of data files (overhead view perspective) are analyzed in order to identify the major objects on the property, which may be buildings, trees, and other significant man-made structures or natural features. In one embodiment, all of the image files are individually analyzed in order to select and utilize different view perspectives useful for extracting particular objects on the property as well as features and details associated with the objects. For example, overhead views are most useful for identifying individual major objects such as building structures and other significant features. In some embodiments, a three-dimensional model can be created from the different perspective view images to represent elevation and surface definition information for building structures and other features and attributes of the target real property parcel(s).

In step 207, selected images in a second set of data files (ground level view) are analyzed in order to identify and evaluate attributes and characteristics of the objects identified in step 206, for example, number of stories of the building, façade type and materials, windows in the building, roof type and materials, trees outside of the building, etc. For this step, a ground level view or an oblique view is useful to characterize the objects. Additional images including other view perspectives may be obtained and used as necessary or desired to both enhance the accuracy of the analytical techniques and to continually train the machine-learning models used to perform the analyses on new image data.

In step 208, the first set of images and the second set of images are considered and evaluated together in an integrated analysis that serves to confirm and clarify details of the analysis performed in steps 206 and 207.

As noted above, the image analysis steps are performed using one or more specialized computer-implemented models that have been developed to identify and characterize objects and related attributes through computer vision and machine learning techniques, and the models have been trained on sample data sets, as will be discussed in more detail below.

In step 210, a report is compiled and generated as part of a graphical user interface for display on a client device, including some or all of the images and a listing of some or all of the objects identified in the images and their characterizations for each physical property address. In step 212, a link to the web-based report is sent to the client. Based on the report, the client (e.g., an insurer or underwriter) can provide valuations for the list of properties to support offers of insurance or reinsurance.

A typical property inspection report will contain a listing of baseline features and additional features of the property. For example, the baseline general building features include geolocation (geographic location of building/property) and parcel number; footprint and square footage; construction type (wood frame, masonry, reinforced concrete, metal, tilt-up, other); year built (estimate); and number of stories. Important roof information includes roof pitch and geometry, material and condition. Important façade information includes exterior façade material(s) and condition The accuracy of risk analysis and replacement value and/or reconstruction cost estimating is enhanced by providing any additional available data related to additional property features and attributes, such as shape, occupancy types; exterior cladding material; roof material; windows and/or skylights;

and swimming pool, to name a few examples. Further, additional information, such as proximity to key environmental features, such as trees and other vegetation, fire hydrants and other emergency resources, lakes and reservoirs, and other natural and man-made hazards, can be important for evaluating risks.

Thus, the output data from the analysis of images is formatted into a user-friendly web-based report that provides a complete review of the building and its surroundings, including baseline building features, details of roof and façade features, and any additional property features and attributes identified as potential assets associated with the real property parcel.

Figure 3:
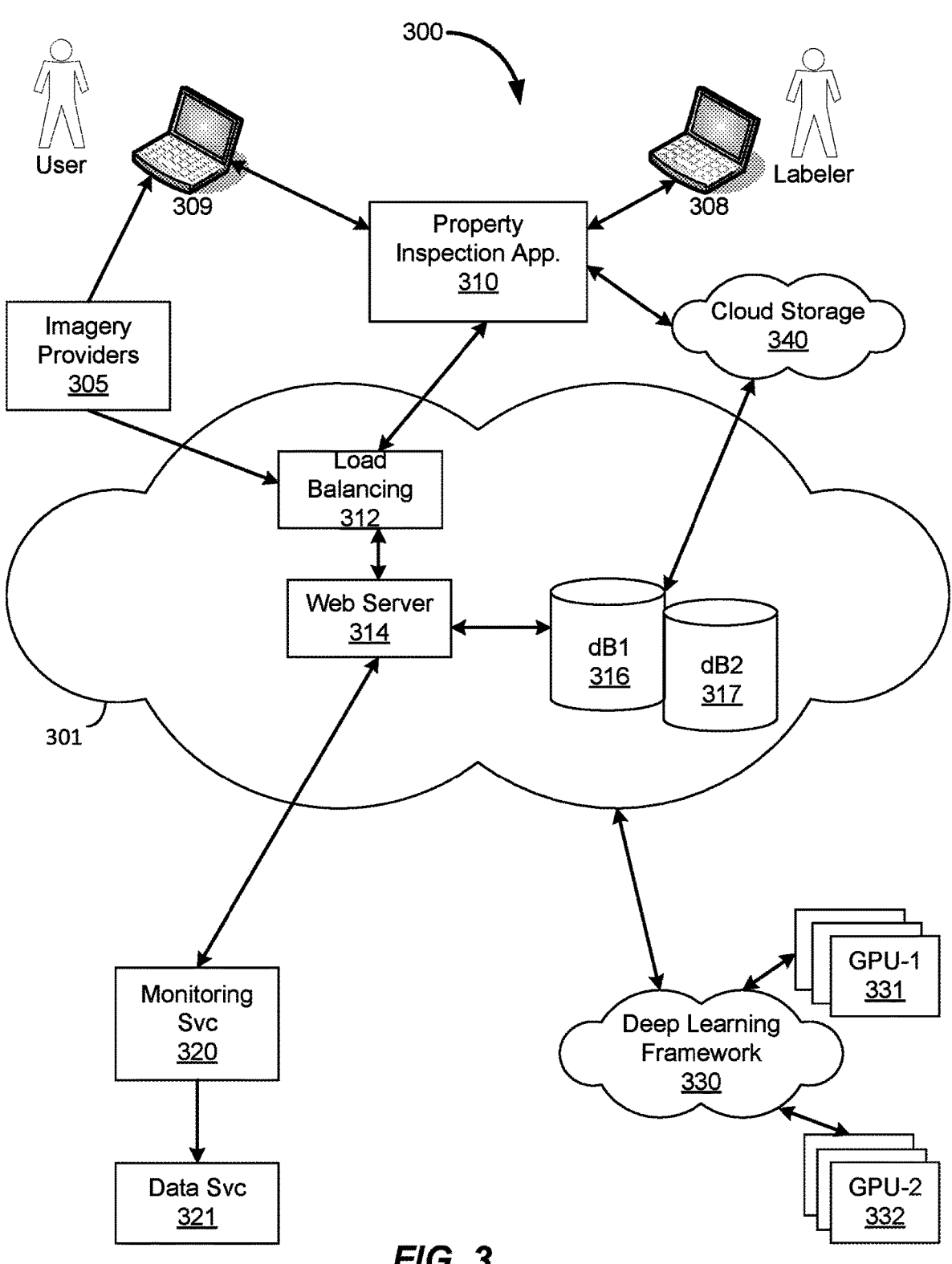
FIG. 3 is a system architectural diagram for one embodiment of a property inspection service.

FIG. 3 is a detailed architectural diagram illustrating one embodiment of a web-based system 300 for generating an automated property inspection report for commercial properties through the use of trained models that utilize machine learning and computer vision. A user, such as an agent seeking to provide an insurance or reinsurance estimate to a customer, uses a first client device 309 to run a property inspection application 310. The property inspection application 310 is preferably hosted as a web-based service; but may also be configured with a client portion installed on the client device and a web-based server portion. The property inspection application 310 is configured to interact with a web-based property inspection service 301, in order to utilize various components of the web service 301 and related resources for obtaining data for evaluating the physical property addresses provided by the user. Further, in one embodiment, the various components of web service 301 are organized with software as "containers" such that each component is isolated from other components and bundles together its own application, tools, libraries, and configuration files. Containerization is an operating system level virtualization technique originally developed by Docker, Inc.

The first cloud-based component of the web service 301 is a first server 312, which is configured to act as the front-end, load-balancing component in order to manage ingress of data from user device 309. In one example, the first web server 312 may be configured with software from Nginx, Inc. to provide an asynchronous event-driven approach to handling requests, rather than using threads, thereby providing a more predictable performance, particularly under the high loads required for most image processing tasks.

A second server 314 is configured as the main web server for hosting the web service 301 and provides a web framework for the image inspection pipeline. For example, Flask is a micro web framework written in Python that is used for detecting custom objects and building classification models on state-of-the-art deep neural networks. The web server 314 requests image data from imagery partners 305 and integrates the various images of different view perspectives, e.g., the ground view, the overhead view, and any other views (such as oblique), into a single display on a user interface for review by the user.

The web server 314 is coupled with a monitoring service 320 external to the web service 301. The monitoring service 320 provides performance and diagnostics data for web service 301, and may also utilize other data services to facilitate analysis of large datasets such as presented by the image-intensive data handled herein.

The web server 314 is also coupled with a first database 316 and a second database 317. The first database 316 is an object-relational database management system that is used for storing objects that are associated with property features, and may be implemented, for example, using the PostgreSQL database (or simply Postgres). The second database 317 provides a data structure for storing the list of features associated with each property. For example, Redis is an open-source data structure implementing a database, and useful for abstract data structures such as strings, lists, maps, etc.

Another external resource coupled to the web service 301 is a deep learning framework 330. Deep learning (also known as deep structured learning or hierarchical learning) is a type of machine learning that is based on learning data representations rather than learning task-specific algorithms. For example, PyTorch is an open-source machine learning library that provides deep neural networks that are well-suited for processing in computer vision applications. Caffe2 is an open-source deep learning framework that is geared towards image classification and image segmentation, and in the present case, is useful for classifying objects identified in the various images of a property.

Since the current application relates to image processing, which is a resource-intensive operation, the deep learning framework 330 uses multiple graphics processing units including GPUs 331, which are local to the deep learning module, and GPUs 332 for additional cloud-based processing power to perform image analysis with the trained models.

Finally, the results of image processing are stored in the first database 316 and used to generate a digital report for display as a formatted user interface. The formatted display is uploaded to the property inspection application 310 where it may be viewed or downloaded by the user 309.

The system 300 can be securely configured to limit and/or restrict access, for example, by defining and assigning roles to different users. Such restrictions are normal and customary for computer-based services. Thus, a customer of the property inspection service would likely not be granted permission to access and edit data, but instead might be restricted to uploading addresses and downloading reports. Other roles should be defined, such as administrative roles for maintaining and updating relevant databases and other resources.

A "labeler" role 308 is defined to manually annotate images and to review the automated annotations of objects and related characteristics generated by the property inspection service. The labeler 308 is an administrative user with permission to access the database 316 through application 310 to review and edit information stored with associated images.

Initially, the labeler 308 (or a similar administrative role) manually annotates test images, for example, to identify buildings from a top down view, then to identify attributes of the building from a ground level view or an oblique view. The annotated test images form the training set for a machine learning processing scheme configured to evaluate such images.

A "supervisor" role may also be defined to review the annotations of the labeler. In deployment, the property inspection service (1) ingests images for a specific property, then (2) automatically identifies objects and their attributes from the images using the machine learning based image processing scheme and generates a report; and (3) a labeler reviews some or all reports to check the identification of objects and attributes, and makes edits as necessary. In many instances, (4) a supervisor verifies the accuracy of the labeler's edits. Leanings from steps 2-4 are used as training data to update and improve the machine learning processing scheme as time and experience proceeds.

Figure 4A:
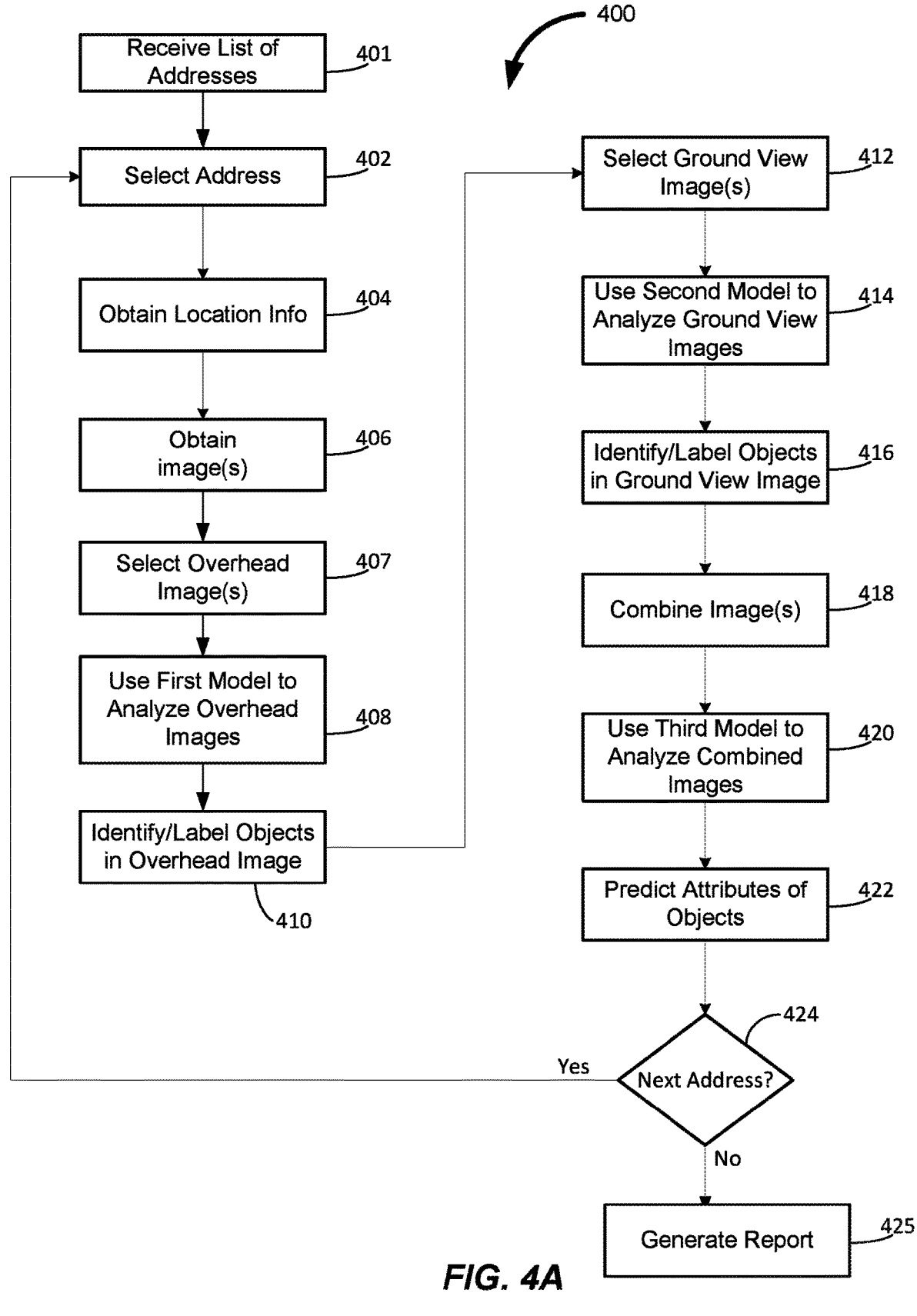
FIG. 4A is a flow chart illustrating a detailed process for automatically generating a commercial property inspection.

Referring to FIG. 4A, a more detailed process 400 for providing a digital property inspection report according to one embodiment is illustrated.

In step 401, the property inspection service receives an address, or more typically, a list of addresses from a user. In step 402, the service selects a first address from the list of physical addresses provided by the user. In step 404, information including location information corresponding to the first parcel in the list of physical addresses is obtained. For example, GPS coordinates associated with the physical address are typically readily available from different commercial information sources. Additional location and relevant property information may be obtained from government resources, such as real property parcel databases having appraisals and other information, or open datasets such as OpenStreetMap or OpenAddresses.

Once the geolocation is known, in step 406, a first set of images is obtained using the GPS coordinates. These images include overhead images, such as a satellite image or an aerial image, but may also include images taken from a different perspective relative to the location. For example, there may be photographs taken from airplanes, helicopters, drones, tops of tall buildings, etc., that correspond to the geolocation and which provide an accurate depiction of the location from an overhead and/or oblique angle. Oblique images may be extremely useful for extracting features but is also the most expensive of the imagery sources. Ground view or street view images are also included. Current images may be obtained in real-time from third-party vendors, or images may be stored in local storage or remote storage and retrieved as necessary.

In step 407, one or more overhead images of the parcel are selected from the first set of images. In step 408, the selected overhead image is analyzed to identify and characterize major object items, such as one or more building structures at the location, and to identify other objects of the property that are apparent from a top-down view, such as trees adjacent to the building structure(s). In step 410, the objects are identified and labeled. The analysis and marking of the images in steps 408/410 is performed using a first model that is constructed as a neural network to implement computer vision algorithms for the purpose of identifying major objects from a view perspective that is above the location. The first model is developed and trained using one or more test sets of training data. For example, a labeler manually annotates one or more sample aerial images to identify building footprints by drawing a polygon that defines the perimeter of the building, and the first model is trained with the sample annotated images using computer vision techniques and machine learning techniques. The building footprint is the most important object derived from the aerial view, but other objects are also identified and annotated to help train the first model, for example, by drawing a polygon or a bounding box around the object.

Figure 4B:
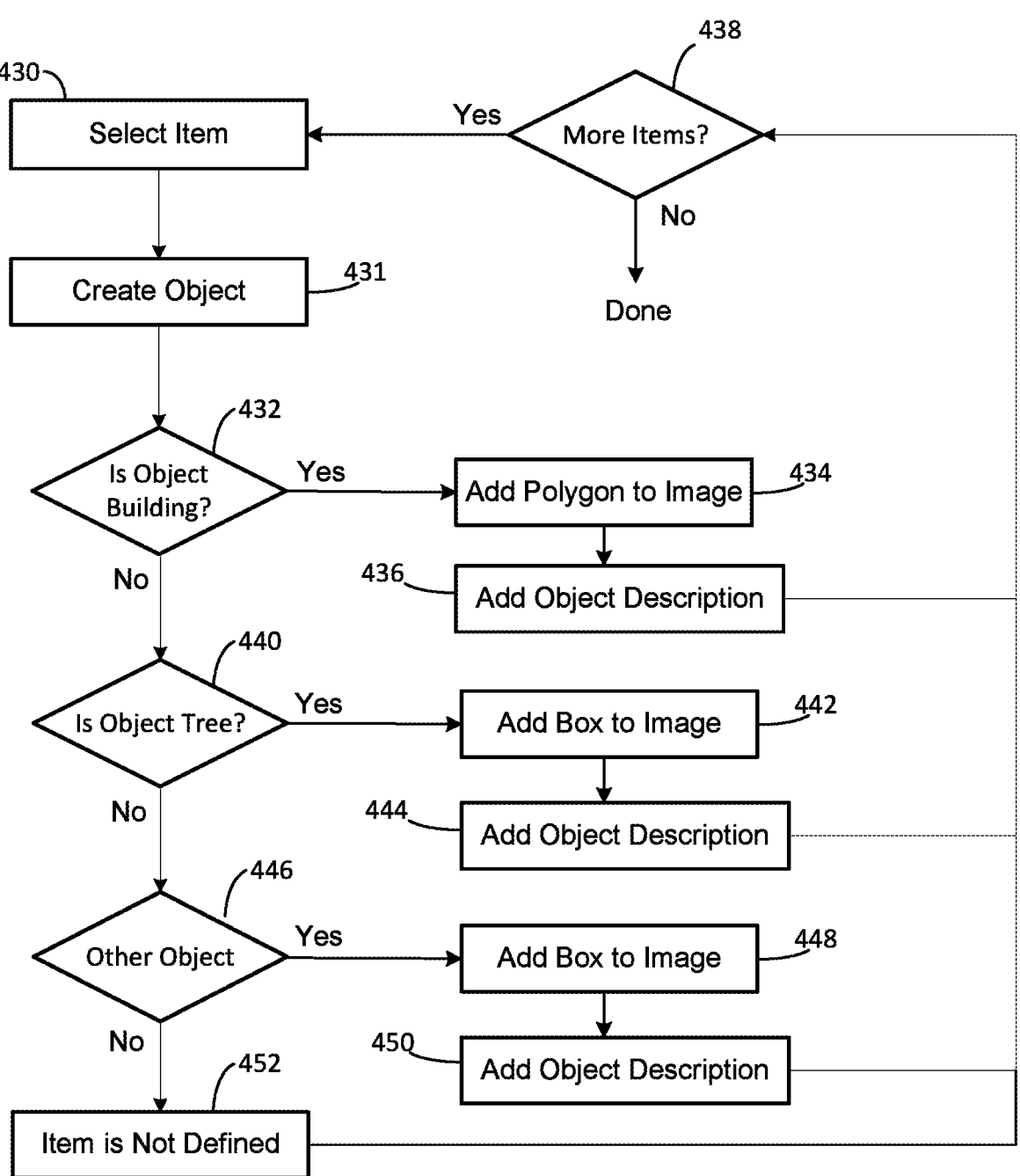
FIG. 4B is a flow chart illustrating a portion of the process of FIG. 4A utilizing a first trained model.

FIG. 4B illustrates one method for implementing steps 408/410 using the first model. In step 430, an item in the overhead view is selected, and in step 431, a data object is created to identify and characterize the item. If the first model interprets the item as a building structure in step 432, then a polygon is added to the aerial view image in step 434 to indicate the perimeter of the building structure, and a description of the item from the first model is stored with the data object in step 436. If there are more items to select and characterize in step 438, then the process returns to step 430 to select and evaluate another item in the overhead view. If not, the routine ends.

If the first model did not interpret the item as a building in step 432, then the first model considers whether the item is a tree in step 440. If so, then in step 442, a bounding box is added to the overhead view image around the tree, and a description of the item from the first model is stored with the data object in step 444. If there are more items to select and characterize in step 438, then the process returns to step 430 to select and evaluate another item in the aerial view. If not, the routine ends.

If the first model did not interpret the item as a tree in step 440, then the first model considers whether the item is some other defined object in step 446. If so, then in step 448, a polygon (or some bounded shape) is added to the overhead view image around the object, and a description of the item from the first model is stored with the data object in step 450. If there are more items to select and characterize in step 438, then the process returns to step 430 to select and evaluate another item in the aerial view. If not, the routine ends.

Of course, there could be many other types of items defined in the first model that are identified and stored as a data objects in the analysis step 408 of process 400, and additional similar decision trees could be implemented as in FIG. 4B. For example, the overhead view may show trees, walls, pools, solar panels and location layout. The overhead view may also show building damage, such as from fire or earthquake, or imminent risk to building structures from adjacent natural or man-made hazards.

FIG. 5 shows an exemplary table 500 useful for defining objects. A first column 502 lists a number of different object types that can be recognized and created for a particular property. The second column 504 lists the output type associated with each object type, that is, what physical icon or shape will be associated with the object. The third column 506 includes an explanation of the object. For example, the first item listed in table 500 is identified as a "building footprint" object in the first column 502, and each building footprint object is represented on the relevant image with a polygon, as indicated in the second column 504, with an explanation as indicated in the third column 506.

FIG. 6 is an exemplary table 600 for defining attributes associated with objects. A first column 602 lists a number of different attributes that can be associated with a particular building structure data object, such as street address, latitude and longitude; number of stories; etc. The second column 604 lists the output type associated with each object type, namely, a numeric value or a text value. The third column 606 includes a description of the attribute. The table 500 of defined objects and table 600 of defined attributes associated with defined objects are merely illustrative and may include other defined objects and attributes.

Returning to FIG. 4A, once the overhead image(s) are analyzed, one or more ground view images are selected for the property location in step 412. In fact, the overhead images can provide helpful perspective for choosing useful ground view images. For example, based on the location of buildings and trees, the most effective ground level perspective views for analyzing the building structures can be chosen from among multiple images.

In step 414, the ground view image is analyzed using a second model, and in step 416 objects appearing in the ground view image are identified, labeled and correlated with objects identified using the first model on overhead images. The second model evaluates ground view images of the building façade, for example, to provide information that cannot be ascertained from the overhead images, and in particular, the floor baseline. For each building, many candidate images are obtained, for example, from vendors such as Bing, Streetside and Mapillary, and from crawling external website like Yelp, MLS listings and business websites. Each candidate image is evaluated for its usefulness—is the building clearly visible, or is the view obstructed by other buildings or trees. Other factors include timeliness—was the image captured recently? It is also important to capture views of the property from different sides so that the different views may be compared to each other.

The second model is also constructed as a neural network to implement computer vision algorithms for the purpose of identifying features from the ground view perspective, in particular, identifying the primary building structure, the floor baseline, windows in the primary building structure, and the number of stories or floors in the building structure. The second model is developed using training data in the same manner as the first model. For example, a labeler manually annotates one or more sample ground view images to identify a building as the primary building structure and to draw boxes or polygons around windows on the primary building structure. The ground view images typically allow the user to view a location from multiple sides.

Figure 4C:
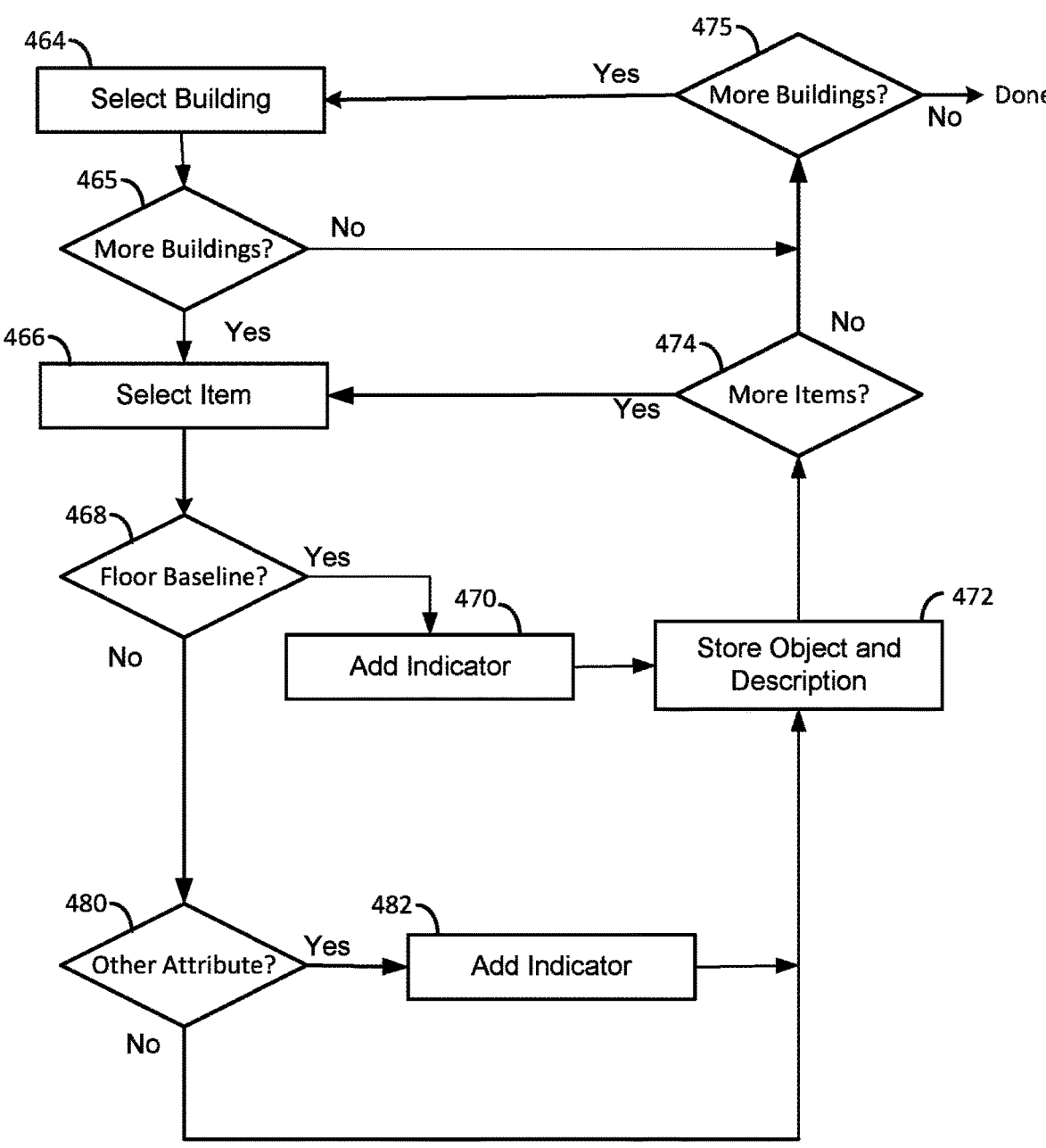
FIG. 4C is a flow chart illustrating a portion of the process of FIG. 4A utilizing a second trained model.

FIG. 4C illustrates one method for implementing steps 414/416 using the second model for each building structure identified in the overhead view.

In step 464, a building that was identified in the overhead view is selected from a ground view image. The first objective is to identify the primary building (if more than one building structure on the parcel). If analysis of the selected ground view image by the second model confirms that the identified building is the primary building in step 465, then in step 466, an attribute (item or feature) that is apparent on the primary building structure in the ground view is selected. If analysis of the selected ground view image does not confirm that the selected building is the primary building structure in step 465, then the process jumps to step 475 to see if there are additional buildings to consider and then back to step 464 to select a different building.

One of the important attributes from to extract from the ground level image is the floor baseline. For example, in the United States, the "lowest floor elevation" must be determined in order to comply with National Flood Insurance Program minimum elevation requirements. Overlapping points from the overhead view and ground view can be selected to determine the precise location of a given point, and the elevation of the given point determined in accord with FEMA guidelines. If the second model interprets the selected item on the selected building as the floor baseline, for example, in step 468, then the floor baseline is positively indicated by some means. For example, a bold line may be imposed onto the building image at the floor line in step 470, and the floor baseline item is stored as a data object along with a description from the second model in step 472.

If there are more items present in the selected ground view image in step 474 for this building object, then the routine returns to step 466 to select the next item.

If there are no more items to be selected for this building object in step 474, then if there are other building objects on the parcel to evaluate in step 475, the process returns to step 464 to select another building and repeat the analysis. If there are no more buildings to consider in step 475, the process ends.

If the second model does not interpret the item as the floor baseline in step 468, then another attribute item, such as a window, can be considered in step 480. Additional decision trees can be added for as many defined attributes as are specified. If the next attribute item is identified in the ground level image in step 480, then the item is indicated by some means in step 482, for example, bounded with a box or polygon, and the item is stored as a data object with a corresponding description in step 472. The process then returns to step 474 to see if more items are present in the ground view for this building object, as if so, the routine returns to step 466 to select the next item. If the second model does not interpret the item as the other attribute in step 480, process then returns to step 474.

Returning again to FIG. 4A, once the analysis of the ground view images is completed, the overhead image and the ground view image are considered together in step 418, and a third model is used to analyze both images with an integrated approach in step 420 in order to predict attributes that are to be associated with identified objects. In step 422, the predicted attributes are associated with corresponding objects that have been classified and labeled.

Previous steps only included singular information about a building like a satellite image or ground image. However, some building attributes require multiple views in order to make a correct assessment. For example, a building may appear to have three stories when viewed from one side, but five stories when viewed from the other side. Another example is square footage—multiple perspectives of a building are needed to correctly understand the shape of the building.

The third model not only combines multiple images, but also includes external information. For example, to determine the construction type, in addition to considering the building information, the system can obtain additional information such as building codes, local building standards, building age, building dimensions, and other relevant information. Other external data can also be considered, such as from property appraisal sites or governmental census data. As the data quality differs between each region and is typically provided by local governments (e.g., counties in the US), a trust score can be associated with each data source. Combining all this information together, the model makes a final determination of attributes such as number of stories, construction type, replacement cost, occupancy type, square footage, or building condition.

The third model is also constructed as a neural network to implement computer vision algorithms for the purpose of predicting attributes of selected objects from multiple images using an integrated approach to the images. The third model is developed using training data with sample data sets in the same manner as the first and second models. For example, a model can be trained when a labeler manually annotates one or more images to identify attributes from the combined analysis of images, such as the number of stories in a building.

Once processing of one address is complete, then the routine determines whether there are more addresses to process in step 424. If so, the process returns to step 402 to select the next address. If there are no more addresses to process in step 424, then a report is generated for the user in step 425 and the routine ends.

Figure 7:
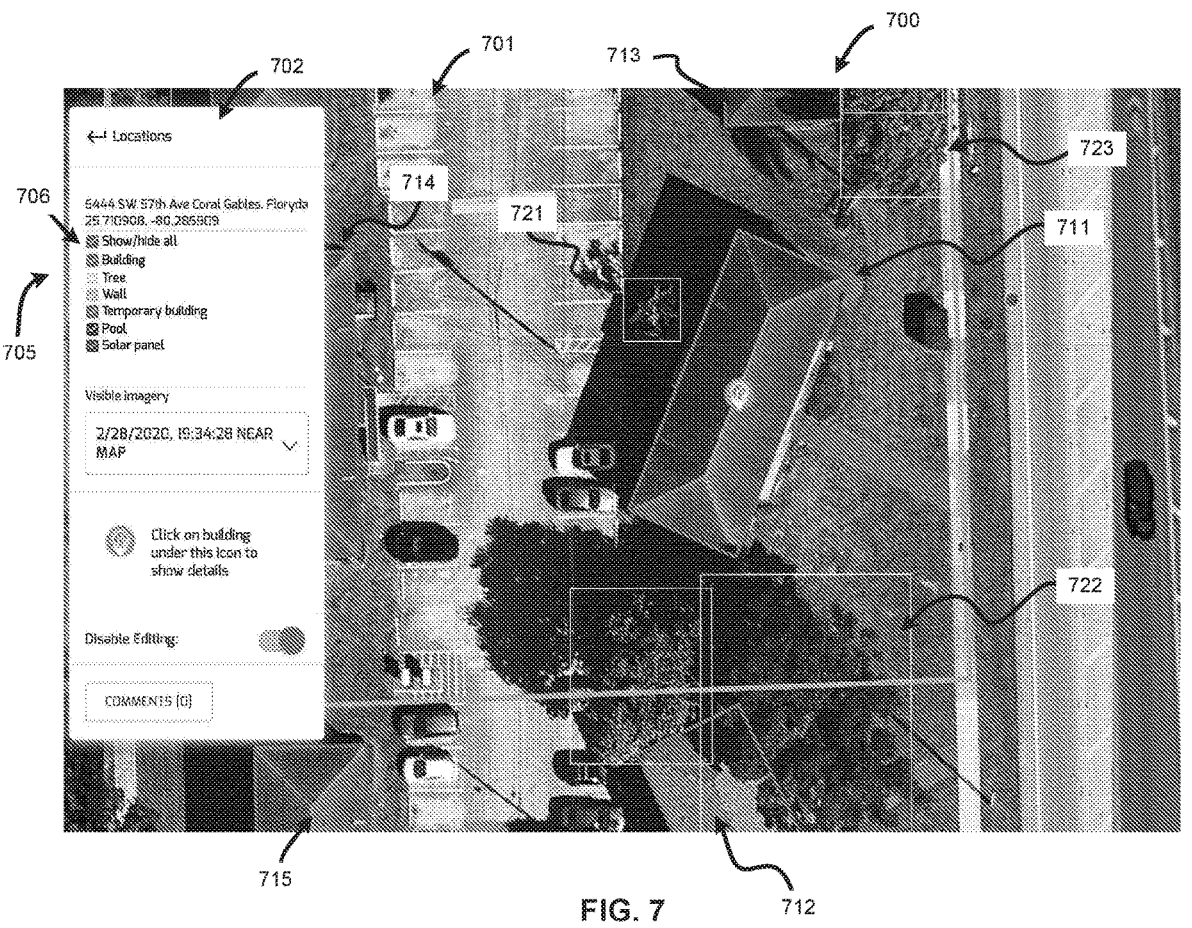
FIG. 7 is a first user interface displaying the results of analyzing aerial images using the first trained model.

An example of the operation of process 400 will now be described. FIG. 7 shows an example of a first digital user display 700 having a first main window 701 displaying an embedded image that is an aerial view of a property location and a second window 702 displayed within the first window and listing information about the image. The aerial view is analyzed by a first trained model as described above with the primary objective of automatically identifying buildings (and/or their footprint) and other major objects on the parcel.

The aerial image in the first window 701 shows a commercial property having five buildings. The first trained model has analyzed the image to identify the first building (or its footprint) by marking the perimeter of the first building with a polygon 711; similarly, the perimeter of the second building is marked with polygon 712; the perimeter of the third building is marked with polygon 713; the perimeter of the fourth building is marked with polygon 714; and the perimeter of the fifth building is marked with polygon 715.

Many trees are also evident in the image and have been recognized and marked by the trained first model with boxes. For example, box 721 marks the tree adjacent the building 711; box 722 marks the tree adjacent the building 712; and box 723 marks the tree adjacent the building 713. Other objects may be apparent in overhead images and will be designated according to the legend included in window 702.

The pop-up window 702 in user display 700 includes information about the image and the various markings. For example, a list 705 of individual objects of interest is presented in the second window 702, and each listed object type includes a check box 706 in front of the item. The check box 706 may be selected (or deselected) to view (or remove) that object on the image. Each item in the list may also be hyperlinked so that the corresponding objects are highlighted upon selection. The listed objects in window 702 could of course include other objects of interest as specified.

Figure 8:
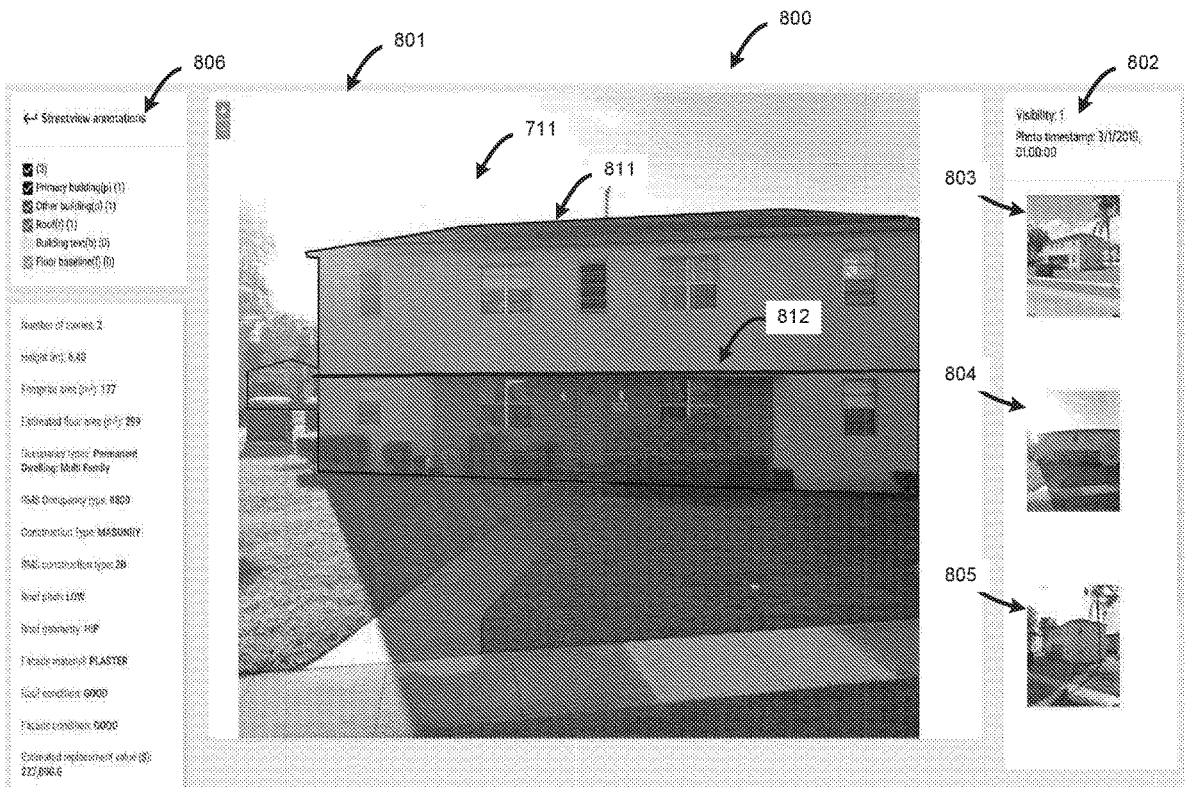
FIG. 8 is a second user interface displaying the results of analyzing street view images using the second trained model.

FIG. 8 is an example of a second user display 800 for displaying one or more different perspective views of the same property depicted in FIG. 6, and in particular, different perspective views of the main building bounded by rectangle 711 as shown in FIG. 7. In this example, the display 800 includes a first main window 801 displaying a first embedded image that is a ground level or street view of the building 711. A second window 802 is configured as a preview pane within display 800 that includes additional ground level images 803, 804, 805 of building 711. User selection of a different image in the preview pane 802 moves the selected image into the main window 801 and moves the replaced image into the preview pane. If additional images exist, the window 802 may be enabled to scroll down through the multiple images.

It is noted that street view technology typically provides interactive panoramas formed as a series of stitched images, which are accessible to users through a JavaScript application programming interface ("API"). Thus, the set of street view images selected using the methods disclosed herein may be obtained as a series of associated images of the same parcel (or preferably the identified building structure) but taken from different lateral points of view. Therefore, the multiple images 803, 804, 805 and others in the preview pane 802 can, for example, provide a ground level view of each side of building 711, further enhancing the ability of the models to recognize and characterize objects and their attributes on the subject property.

A third window 806 is configured as an information pop-up within display 800, listing information about the object in the selected street view image displayed in the main window 801. Selection of a different image into the main window 801 causes the listed information in window 806 to be updated for the selected image.

In street view image displayed in the main window 801, the first building 711 is visible and its outline is recognized and marked with a nearly-rectangular polygon 811. In addition, the two stories of building 711 are recognized and a line 812 delineates the two floors within polygon 811. The analysis of street view image(s) by a second trained model has the primary objective of also identifying the major objects, such as building 711, but can also extract additional information, including number of stories, construction type, and a list of possible occupancy types.

Figure 9:
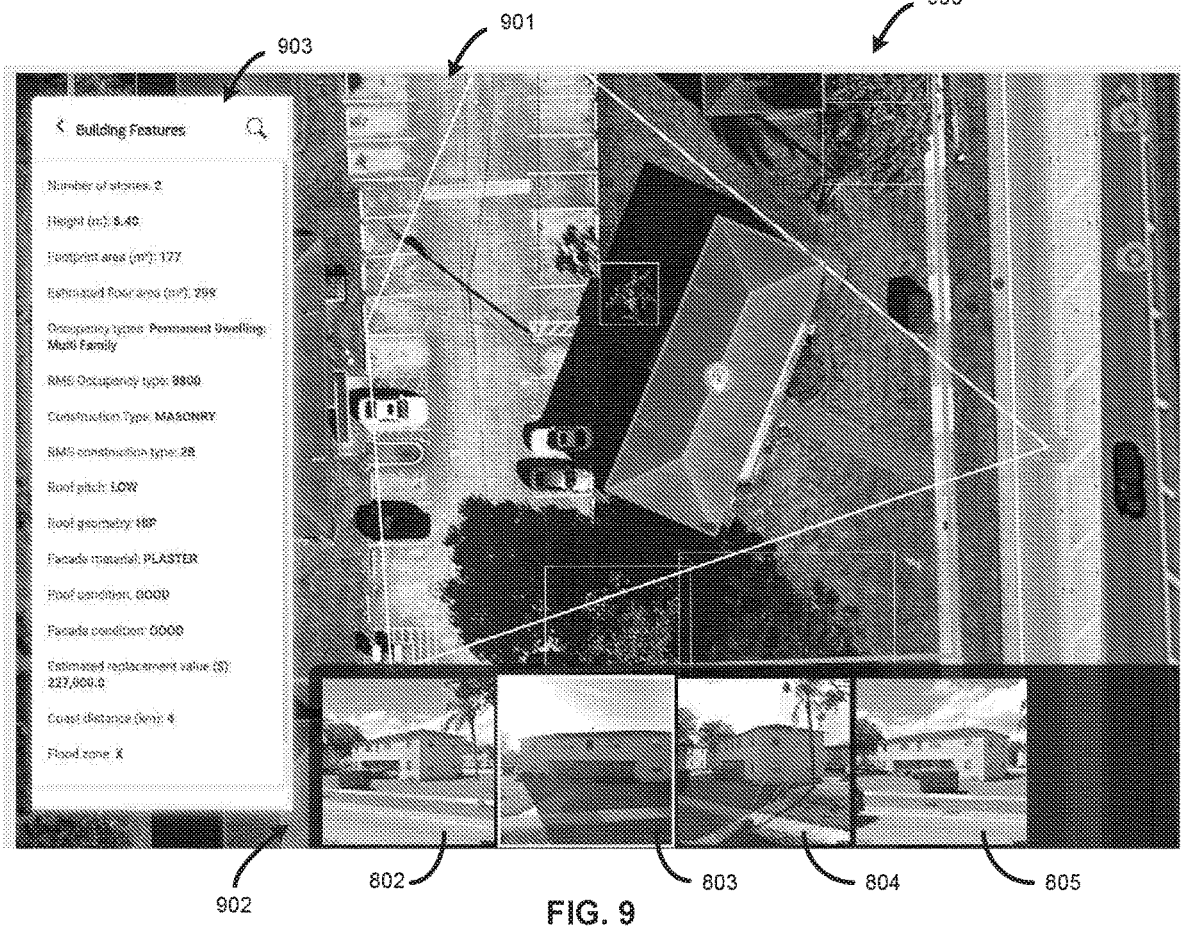
FIG. 9 is a third user interface displaying the results of analyzing both the aerial images and the street view images concurrently using a third trained model.

Finally, in FIG. 9, the aerial view and the street views are all presented in a single integrated display 900. The display 900 includes a main window 901 in which the selected view is displayed as a large image, and in this case the overhead view from FIG. 7 is selected.—A second window 902 is configured as a preview pane similar to the preview pane 802 in FIG. 8, and includes the ground level views 803, 804 and 805 from FIG. 8 and an additional ground view image 806. Any of the images in the preview section can be selected for display and swap-out in the primary image display. The third trained model takes both views into consideration using an integrated approach in order to predict the features and attributes associated with objects identified on the property by the first and second models.

A third window 903 is a pop-up window within display 900 and includes a list of attributes and corresponding values is displayed in window 902 to the left of the image display areas.

Reports may be customized based on customer needs, and the system adapted based on user specifications. For example, the type and quantity of imagery to obtain will be based on needs but also usually constrained by cost. Oblique imagery can provide more information than overhead or ground level views, but is less available and more expensive. Overhead images from satellites cover most of the world and are easy and inexpensive to obtain. Ground level images are widely available in the United States but are not always current.

In general, the techniques described herein for obtaining and processing different image perspectives can be used for a number of different purposes related to the evaluation of real property parcels including structures and other valued asset objects on such parcels. In one embodiment, the techniques process the aerial/satellite and ground-level imagery using machine learning solutions to detect materials used for the roof and façade and related attributes, such as ISO construction class, occupancy type and building age.

For example, roof materials to be detected include (but not limited to) ceramic tile, cement tile, bituminous tile, steel tile, flat sheet, corrugated metal, bituminous waterproofing, shingle, asbestos-cement flat sheets, and asbestos-cement corrugated sheets. Façade materials to be detected include (but not limited to) plaster, brick, cement block, stone, concrete, metal, glass, wood, timber framing, plastic, sandwich wall, aluminum composite panels ("ACP"), with emphasis on detecting ACP panels.

Occupancy type can be categorized, for example, as residential, commercial, industrial, restaurant, mercantile, public, education, transportation, utilities, miscellaneous. Building age can be classified, for example, prior to 1950; 1950-1976; 1976-1995; 1995-2005; after 2005.

The first step, as previously described, images from different perspectives are obtained and stored. The overhead views (aerial/satellite) are then analyzed in a machine learning model to make a determination as to which of the ground-level images provides the best angle/view of the building from the ground level. This enables selecting an optimal set of ground level images as input to the feature selection model. Then from the set of all available ground-level images, four images are selected using following criteria, from the most important to the least important:

visibility of all sides of the main building, total visible surface of the main building, minimal number of obstacles covering the main building.

Figure 10:
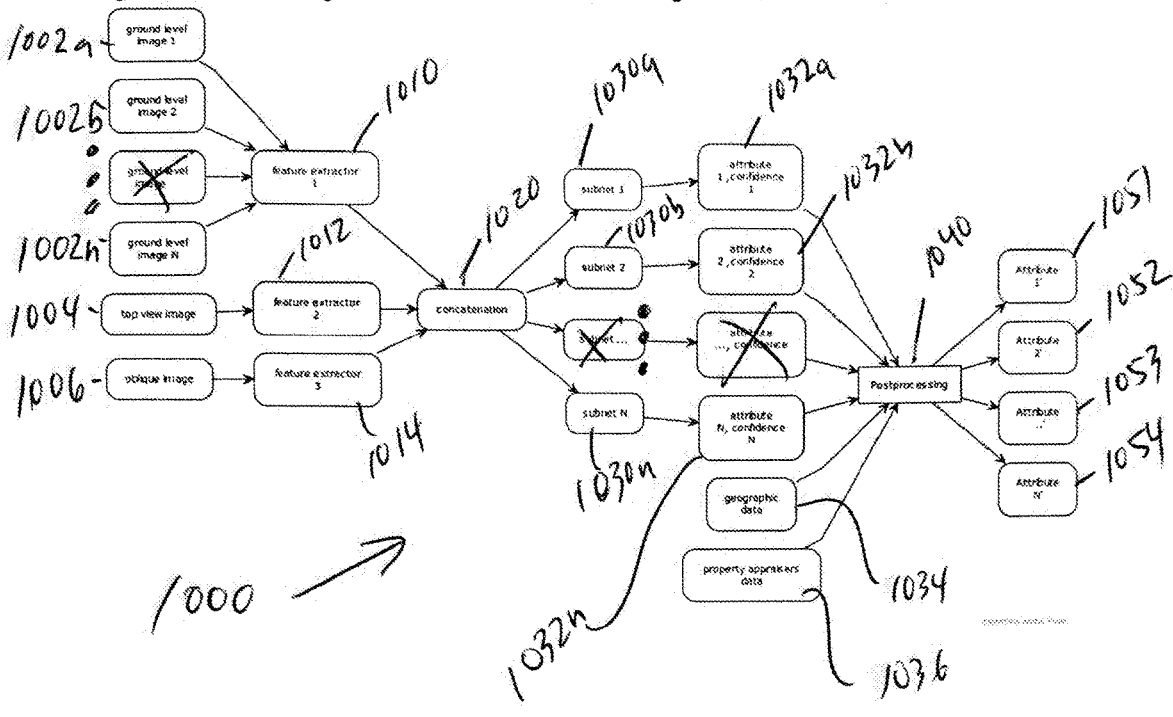
FIG. 10 is a flow diagram illustrating a model for extracting building features.

Referring to FIG. 10, the main model 1000 for extracting building attributes is illustrated. Multiple ground-level images 1002a, 1002b . . . 1002n are provided as inputs to a first feature extractor 1010. At least one top view image 1004 is provided as input to a second feature extractor 1012. Optionally, at least one oblique view image 1004 is provided as input to a third feature extractor 1014.

The images are processed by respective feature extractors (which are neural networks) to obtain feature embeddings. The feature embeddings are then concatenated in module 1020 to form a unified representation of the building. Feature extractor networks may be a convolutional or transformer neural network pre-trained on a publicly available dataset such as ImageNet and fine-tuned on the downstream task (building attributes classification or regression as in this case).

This unified representation is provided as input data for multiple building attribute detection subnets 1030a, 1030b . . . 1030n. Each subnet is configured to detect a single attribute, such as roof material, facade material, construction class, occupancy type, and building age. Each subnet consists of a linear fully-connected layer which transforms feature embeddings (unified representation of the buildings) into a feature vector having a size corresponding to the number of classes of the particular building attribute. The value or class determined for each feature at the subnets is accompanied by a corresponding model confidence score determined at modules 1032a, 1032b . . . 1032n. The softmax layer is applied to transform the obtained feature vector into the confidence score for every class.

The last step of the feature detection is post-processing at module 1040. All the features and their respective confidence values form an input vector to the post-processing step 1040 for fine-tuning the results. Each attribute depends on the set of all the detected attributes, as well as additional data, such as geographical location data 1034 of the building and external information 1036 from property appraisers. For example, wood frame construction class has a higher chance being detected for residential rather than commercial buildings. Thus, the detected attributes form the input data set for the post processing model 1040, and are confirmed and finalized as attribute results 1051, 1052, 1053, 1504, etc. For various building attributes, the post processing step 1040 may consist of different models, such as algorithms, linear regression, decision trees, etc.

The foregoing description has been presented for the purpose of illustration and description. It is not intended to be exhaustive or to limit the disclosure to the precise form disclosed. Many modifications and variations are possible in light of the above teachings. It is intended that the scope not be limited by this detailed description, but by the claims and the equivalents to the claims appended hereto.

The invention claimed is:

1. A method for determining attributes of a building located on a parcel of real property, implemented in a server having software executing thereon comprising an Artificial Intelligence (AI) model, the method comprising the steps of:
    obtaining a plurality of images of the building including a plurality of ground level images and at least one overhead image;
    generating a plurality of spatial feature maps for each of the plurality of images;
    concatenating the plurality of spatial feature maps to form a representation of the building;

providing the representation of the building to a subnet of the AI model, which transforms an embedded feature in the concatenated spatial feature map to a feature vector; and
    identifying a building attribute from the feature vector, wherein the AI model is trained on sample data sets including a lookup table with details of attributes.

2. The method of claim 1, further comprising the step of: determining a confidence value for the building attribute.

3. The method of claim 1, further comprising the steps of: analyzing the overhead image to determine a preferred camera angle for ground level images;
    selecting a subset of the plurality of ground level images; and
    generating a plurality of spatial feature maps for the subset of the plurality of ground level images and the overhead image.

4. The method of claim 1, wherein the subnet comprises a first subnet, the feature comprises a first feature, and the feature vector comprises a first feature vector;
    the method further comprising the steps of:
    providing the representation of the first building to a second subnet of the AI model, which transforms a second feature in the concatenated spatial feature map to a second feature vector; and
    identifying a second building attribute from the second feature vector.

5. The method of claim 4, further comprising a third building attribute that is determined by analysis of the first and second feature vectors.

6. The method of claim 4, wherein the first and second feature vectors have a size corresponding to a number of classes of their respective building attribute.

7. The method of claim 6, further comprising the step of determining a first value for the first feature vector with the first subnet.

8. The method of claim 7, further comprising the step of transforming the first feature vector into a first confidence score.

9. The method of claim 8, further comprising the step of determining a second value for the second feature vector with the second subnet.

10. The method of claim 9, further comprising the step of transforming the second feature vector into a second confidence score.

11. The method of claim 10, further comprising the steps of:
    combining the first value and the first confidence score to form a first input vector;
    combining the second value and the second confidence score to form a second input vector; and
    inputting the first and second input vectors to a post processing module;
    inputting building information to the post processing module; and
    generating attribute results with the post processing module.

12. The method of claim 11, wherein the building information includes a geographic location of the building, historical information about the building, information generated by property appraisers, and a construction class of the building.

13. A system for determining attributes of a building located on a parcel of real property comprising:
    a server having software executing thereon comprising an Artificial Intelligence (AI) model, the AI model:

obtaining a plurality of images of the building including a plurality of ground level images and at least one overhead image;

generating a plurality of spatial feature maps for each of the plurality of images;

concatenating the plurality of spatial feature maps to form a representation of the building;

providing the representation of the building to a subnet of the AI model, which transforms an embedded feature in the concatenated spatial feature map to a feature vector; and identifying a building attribute from the feature vector;

wherein the AI model is trained on sample data sets including a lookup table with details of attributes.

14. The system of claim 1, wherein the AI model further performs the step of:

determining a confidence value for the building attribute.

15. The system of claim 1 wherein the AI model further performs the steps of:

analyzing the overhead image to determine a preferred camera angle for ground level images;

selecting a subset of the plurality of ground level images; and generating a plurality of spatial feature maps for the subset of the plurality of ground level images and the overhead image.

16. The method of claim 1, wherein the subnet comprises a first subnet, the feature comprises a first feature, and the feature vector comprises a first feature vector;

the AI model further performs the steps of:

providing the representation of the first building to a second subnet of the AI model, which transforms a second feature in the concatenated spatial feature map to a second feature vector;

and identifying a second building attribute from the second feature vector.

17. The system of claim 16, wherein a third building attribute is determined by analysis of the first and second feature vectors and the first and second feature vectors have a size corresponding to a number of classes of their respective building attribute.

18. The system of claim 17, wherein the AI model further performs the steps of:

determining a first value for the first feature vector with the first subnet; and transforming the first feature vector into a first confidence score.

19. The system of claim 18, wherein the AI model further performs the steps of:

determining a second value for the second feature vector with the second subnet; and transforming the second feature vector into a second confidence score.

\* \* \* \* \*